United States Patent
Shah et al.

(10) Patent No.: US 9,201,968 B2
(45) Date of Patent: Dec. 1, 2015

(54) SYSTEM AND METHOD FOR FINDING MOOD-DEPENDENT TOP SELLING/RATED LISTS

(75) Inventors: Devavrat Shah, Newton, MA (US); Vivek Francis Farias, Cambridge, MA (US); Srikanth Jagabathula, New York, NY (US); Ammar Tawfiq Ammar, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 13/598,040

(22) Filed: Aug. 29, 2012

(65) Prior Publication Data

US 2013/0054616 A1 Feb. 28, 2013

Related U.S. Application Data

(60) Provisional application No. 61/528,727, filed on Aug. 29, 2011.

(51) Int. Cl.
- G06F 7/00 (2006.01)
- G06F 17/30 (2006.01)
- G06Q 30/00 (2012.01)

(52) U.S. Cl.
CPC .... G06F 17/30867 (2013.01); G06F 17/30997 (2013.01); G06Q 30/00 (2013.01)

(58) Field of Classification Search
CPC ................. G06Q 30/0257; G06F 17/30828
USPC .................................. 707/732, 744
See application file for complete search history.

(56) References Cited

U.S. PATENT DOCUMENTS

| | | | |
|---|---|---|---|
| 7,188,106 B2 | 3/2007 | Dwork et al. | |
| 7,899,688 B2 | 3/2011 | Bonissone et al. | |
| 2005/0102202 A1 | 5/2005 | Linden et al. | |
| 2006/0265369 A1 | 11/2006 | Atcheson et al. | |
| 2007/0118546 A1 | 5/2007 | Acharya | |
| 2008/0010272 A1 | 1/2008 | Schickel-Zuber et al. | |
| 2010/0191680 A1 | 7/2010 | Lee et al. | |
| 2010/0241625 A1 | 9/2010 | Aravamudan et al. | |
| 2010/0268661 A1 | 10/2010 | Levy et al. | |
| 2011/0320307 A1* | 12/2011 | Mehta et al. | 705/26.7 |
| 2012/0016875 A1* | 1/2012 | Jin et al. | 707/734 |
| 2012/0143802 A1* | 6/2012 | Balakrishnan et al. | 706/14 |

OTHER PUBLICATIONS

Farias, et al., "Sparse Choice Models," arXiv:1011.4339v2 [stat.ME] Sep 21, 2011.

Ammar, Ammar and Shah, Devavrat, "Efficient Rank Aggregation Using Partial Data," SIGMETRICS 12, Jun. 11-15, 2012, London, England, UK.

(Continued)

*Primary Examiner* — Jacob F Bétit
*Assistant Examiner* — Van Oberly
(74) *Attorney, Agent, or Firm* — Peter A. Nieves; Sheehan Phinney Bass + Green (57) ABSTRACT

A system and method for determining a rank aggregation from a series of partial preferences is presented. A distribution is learned over preferences from partial preferences with sparse support. A computer receives a plurality of partial preferences selected from two or more preference lists. Weights are assigned to each of said plurality of partial preferences, resulting in multiple ranked lists.

10 Claims, 3 Drawing Sheets

(56) References Cited

OTHER PUBLICATIONS

Lee et al; "Collaborative Filtering with Original Scale-based Implicit Ratings for Mobile Music Recommendations"; in: (online). Information Sciences 180 (2010) 2142?2155, 17 Feb. 2009.

Jagabathula, Srikanth and Shah, Devavrat; "Inferring Rankings Using Constrained Sensing"; IEEE Transactions on Information Theory, 19 Jun. 2011.

Farias, Vivek; Jagabathula, Srikanth and Shah, Devavrat; "A Non-Parametric Approach to Modeling Choice with Limited Data"; Management Science, 21 Jun. 2011 I.

Ammar, Ammar and Shah, Devavrat; "Ranking: Compare, don't Score"; Allerton Conference on Communication, Control and Computation; Sep. 2011.

Farias, Vivek; Jagabathula, Srikanth; and Shah, Devavrat; "Sparse Choice Models"; 21 Sept 2011.

\* cited by examiner

SYSTEM AND METHOD FOR FINDING MOOD-DEPENDENT TOP SELLING/RATED LISTS

CROSS-REFERENCE TO RELATED APPLICATIONS

This application claims the benefit of U.S. Provisional Patent Application Ser. No. 61/528,727, filed Aug. 29, 2011, entitled "SYSTEM AND METHOD FOR FINDING MOOD-DEPENDENT TOP SELLING/RATED LISTS," which is incorporated by reference herein in its entirety.

GOVERNMENT SUPPORT

This invention was made with government support under grant numbers CNS0546590 and NSF1029260 awarded by the National Science Foundation. The Government has certain rights in this invention.

FIELD OF THE INVENTION

The present invention relates to data analysis, and more particularly, is related to ordered aggregation of opinion data.

BACKGROUND OF THE INVENTION

There is currently an overload of available choices for various items like movies, restaurants, books, mobile phone apps, tweets, news articles, etc. This invariably has led to the difficulty of discovering the best items from the astronomical number of available options. Of the various tools available to help people discover the best items, top-selling/top-rated lists are the most popular; examples include NY Times best-selling books, Zagat top-rated restaurants in a city, Yelp top-rated restaurants in a year, best-selling apps in the App store, etc. The lists are determined either using the sales or the ratings of the different items. The top-selling/rated lists reflect the preferences of the people and operate on the premise that a "typical" user would like a popular item. In addition, they can be treated as a democratic and objective way to determine the "best" items.

The main reason top-selling/rated lists are popular is that they are very intuitive and simple. In addition, they need only aggregate level ratings or sales data. This is in contrast to more complex discovery tools such as personalized recommendation engines or top-ten critics' lists (for books or movies), which require data that is difficult to obtain either at the individual level (likes of the user in the form of ratings) or at the item level (the critics should have seen the movie or read the book).

Despite their popularity, the top-selling/rated lists suffer from various limitations. The main limitation is that they fail to capture the subtleties of user preferences because they use only one ranking to reflect the preferences of the entire population. In other words, they cater only to the "typical" or the "mainstream" user. The obvious issue with using only one ranked list to cater to only the "typical" user is that (a) not every user is "typical", and (b) a typical user is not always "typical." More specifically, consider the top-rated restaurants filtered by say location that is generated by a restaurant-ratings site such as Yelp/Zagat. In this case, firstly, the top-rated restaurants might fail to capture the preferences of the user whose tastes may not be mainstream. Secondly, the tastes of the same user vary with the time or mood of the user. For example, a user with mainstream tastes at one time might want to experiment with not so mainstream restaurants depending on the mood.

Given the above limitation, a single top-selling/rated list is not sufficiently reflective of the preferences of the population. A popular solution to this problem is to make personalized recommendations. However, this is not a viable solution in many situations in practice because there may not be sufficient individual-level data to make personalized recommendations. For example many users visiting Yelp or Zagat have never rated a single restaurant.

Thus, a heretofore unaddressed need exists in the industry to address the aforementioned deficiencies and inadequacies.

SUMMARY OF THE INVENTION

Embodiments of the present invention provide a system and method for finding mood-dependent top selling/rated lists. Briefly described, the present invention is directed to a method for determining a rank aggregation from a set of partial preferences including the steps of receiving, by a computer, a plurality of partial preferences, learning a sparse distribution from the plurality of partial preferences, and processing the sparse distribution to rank a first preference list against a second preference list.

A second aspect of the present invention is directed to a method for determining a rank aggregation from a set of partial preferences including the steps of receiving, by a computer, a plurality of partial preferences selected from a first preference list and a second preference list, learning a distribution from the plurality of partial preferences, and ranking the first preference list against the second preference list.

A third aspect of the present invention is directed to a method for generating a preference ranking by a computer, including the steps of determining an aggregate ranking over a collection of items, determining a most likely ordering of the collection of items, and identifying a plurality of topmost ranked items in the collection of items.

Briefly described, in architecture, a fourth aspect of the present invention is directed to a system for determining a rank aggregation from a set of partial preferences including a computer including a processor and a memory configured to perform the steps of receiving a plurality of partial preferences, learning a sparse distribution from the plurality of partial preferences, and processing the sparse distribution to rank a first preference list against a second preference list.

A fifth aspect of the present invention is directed to a computer readable media configured to store non-transient program instructions to perform the steps of receiving a plurality of partial preferences learning a sparse distribution from the plurality of partial preferences, and processing the sparse distribution to rank a first preference list against a second preference list.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

As used within this disclosure, a "pair-wise comparison" consists of the identity of a first item and a second item, and a user preference between the first item and the second item. Various forms of inputs may be translated to pair-wise comparisons, including, but not limited to, ratings, purchase information, transactions, web-logs, and explicit comparison input.

As used within this disclosure, "first order marginal data" is a preference between two items drawn from a preference ordered list of three or more items. First order marginal information for a distribution is the fraction of population that ranks item i as their kth choice among n choices for any $1<=i$, $k<=n$.

As used within this disclosure, a "partial preference" is an indication of a preference of a first item over a second item. Examples of a partial preference data include a pair-wise comparison and first order marginal data.

As used within this disclosure, a "preference list" is a collection of partial preferences. In general the preference list includes partial preferences collected from the same source or similar sources, using the same or similar collection methodologies. For example, the preference list may include all user ratings of a product on a web site.

As used within this disclosure, a "ranking" is an ordering of items in a list, for example, from most preferred to least preferred. An aggregate ranking is an ordering of the items in a list that reflects the collective preference of the user population.

As used within this disclosure, a "score" is a number assigned to an item reflecting the importance of the item according to the distribution. In general, the higher the score, the higher the importance of the item.

As used within this disclosure, a "weight" is a number assigned to a ranked list proportional to the prominence or frequency in the population of a ranked list.

As used within this disclosure, a "sparse distribution" is a distribution with very few ranked lists or permutations or complete preferences with positive probability.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principals of the invention.

DETAILED DESCRIPTION

Reference will now be made in detail to embodiments of the present invention, examples of which are illustrated in the accompanying drawings. Wherever possible, the same reference numbers are used in the drawings and the description to refer to the same or like parts.

The present invention uses multiple ranked lists to reflect the preferences of an entire population. Each ranked-list can be thought of as capturing a particular "type" of user or a particular "mood" of a typical user. To be practically useful, a small number of ranked lists are produced to capture the dominant types or the moods of the population. Thus, instead of treating the entire population as a single entity, the population is partitioned into a few types of sub populations. Equivalently, this solution may be viewed as lying between treating the entire population as one entity at one extreme and treating every individual as a separate entity at the other extreme. In addition, only the ratings or purchase information are used to generate the multiple ranked-lists. Given this, it is not straightforward how to generate multiple rankings that reflect the various "moods" of the population just from the ratings information. The present invention addresses this issue.

The following provides details of an exemplary embodiment of the present system and method. While the following describes the present invention in the context of restaurant ratings, this is merely provided for exemplary purposes and one having ordinary skill in the art would appreciate that it is immediately applicable to other settings such as, but not limited to, movies, books, photos, apps, and other settings.

Figure 1:
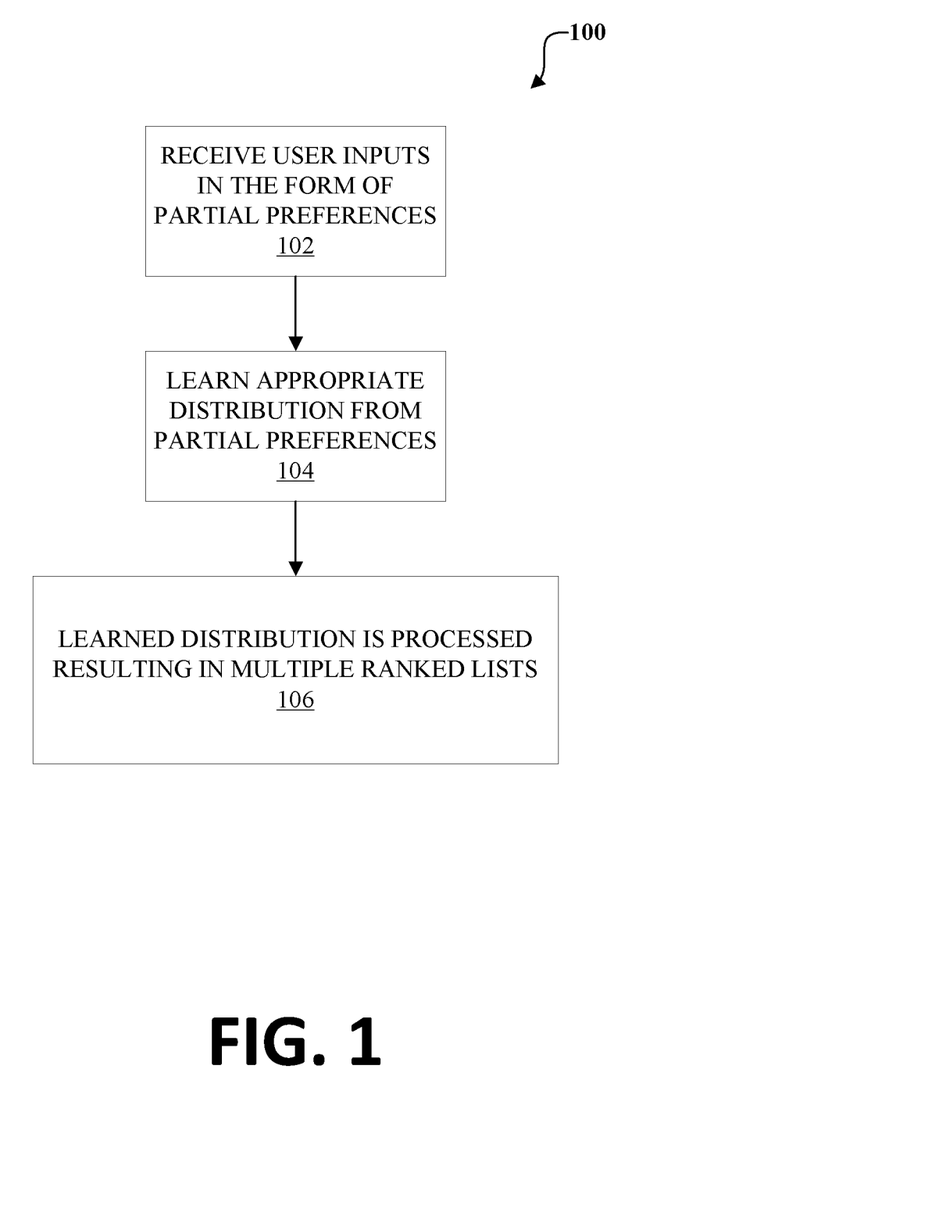
FIG. 1 is a flowchart of an exemplary method according to the present invention.

FIG. 1 is a flowchart 100 illustrating functions performed by the present system in providing the creation of mood-dependent ranked lists. It should be noted that any process descriptions or blocks in flow charts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention. As shown by block 102, user inputs are received in the form of partial preferences. An appropriate distribution is then learned from the partial preferences (block 104). The learned distribution is then processed resulting in multiple ranked lists (block 106). Each of these blocks 102, 104, 106 is described in more detail below.

Block 102—Receiving User Inputs in the Form of Partial Preferences

The type of data the present invention deals with includes various forms of preference data, partial and complete. A complete preference datum for a user contains all the information that can be known about the preferences of a user according to the model in use, that is, a complete ranked list. A partial datum contains any subset of the complete preference datum, for example, a sub-list of any length. One form of data that is of special significance is pair-wise comparison data. Each datum of this form consists of the identity of a first item and a second item, and the user preference between the first item and the second item. In addition to being relatively stable and robust, this data serves as a proxy for other popular data types. Said differently, paired data may either be explicitly collected and used as paired comparisons (explicit), or pair-wise comparisons may be inferred from other types of data (implicit). Below are illustrative examples of explicit comparison methods and implicit comparison methods.

In the simplest case, pair-wise comparisons can be collected directly by giving users a choice between two items, and recording the item that the user selected, or purchased. When feasible, users may be asked to provide a ranked list of all or some of the items. These lists can be converted into pair-wise comparisons. For example, a list ranking A first, B second and C third may be broken out as the pair-wise comparisons of A preferred over B, A preferred over C, and B preferred over C.

In a different set of scenarios, the constraints on the data collection process might be more complicated. For example, one might want to collect multiple pair-wise comparisons efficiently without asking the user to rank the whole collection of items (possibly large) or to go through a large sequence of comparisons. In this situation, the process may be simplified by offering the user an assortment of items, and asking her to choose one of the items. This choice can be interpreted as a preference of the chosen item over each of the other items in the assortment. This kind of assortment-choice data may be collected and utilized in many applications. In an online store, for instance, customers are usually presented with a subset of the items in the store. The user action for example, a mouse click or purchase, identifies one item among many items in an assortment of items, which may be recorded to create a data point of the aforementioned type.

With some additional data, the same approach may be applied to more complicated situations. For example, a data set containing all the transaction and inventory actions processed at a retail store usually includes purchases, sales, and other inventory records, together with associated timestamps for each transaction. Using these timestamps, one may infer the assortment of products on display at the time of every purchase. Once again, this information provides assortment-choice data, which may be converted to pair-wise comparisons.

For example, transaction data may be available without associated inventory data. This provides information regarding what items the user purchased, without identifying other items that were on display yet not selected by the user. In this case, comparisons may be inferred by detecting patterns in the purchasing behavior of the customer. More specifically, a customer who purchased three kinds of breakfast cereal A, B, and C in the following order: AABCCCCCCCCCC. This sequence indicates that the customer purchased breakfast cereals A and B before choosing C, and thereafter continued to purchase C, which could be translated to a preference of C over both A and B, assuming the continued availability of A and B.

Block 104—Learning a Distribution from Partial Preferences

An aspect of the present invention is identifying a family of distributions consistent with the available partial preferences given marginal information. The distributions are usually not unique because the data is insufficient to specify a unique distribution. Therefore, the problem of learning the choice model reduces to the problem of finding an appropriate criterion to select one of the models consistent with the available data. A popular statistical criterion for model selection used extensively in many contexts is the criterion of parsimony, which encourages the selection of the 'most parsimonious' model consistent with the data.

The criterion of parsimony is justified in many ways. The criterion is philosophically consistent with the Occam's razor philosophy, which roughly stated, suggests that under the absence of additional information, one should tend toward simpler theories. In statistical terms, parsimony is born out of the need not to over-fit. Operationally, parsimony is desirable because parsimonious models may be generally easier to handle, both computationally and otherwise.

In parametric models, parsimony has often been translated into parsimony of parameters. For instance, a multinomial logit (MNL) model with N parameters may be considered more parsimonious than an exponential family with $N^2$ parameters. In the nonparametric case, however, the sparsity, or the support size, of the distribution becomes a natural candidate for a measure of parsimony of the model. Furthermore, sparsity may also be naturally born since only marginal information is available. More precisely, a distribution of sparsity no more than $(N-1)^2+1$ is needed to describe the first-order information, which captures the frequency with which an object i is ranked at a position r for all objects i and positions r. Finally, sparse models have found success in both theory and practice in the area of compressive sensing, which has gained recent popularity in the areas of signal processing, coding theory, and streaming algorithms (see D. L. Donoho. Compressed sensing. IEEE Transactions on Information Theory, 52(4):1289-1306, 2006 and E. J. Candes, J. Romberg, and T. Tao. Robust uncertainty principles: Exact signal reconstruction from highly incomplete frequency information. IEEE Transactions on Information Theory, 52(2):489-509, 2006.).

Given the considerations above, the underlying choice model may be recovered by identifying the sparsest distribution that is consistent with the available data. This is further illuminated by the following exemplary functionality.

Functionality

A brute-force exhaustive search would result in a computational complexity of $\exp(\Theta(K N \log N))$. In order to obtain a computationally efficient solution, the search may be restricted to the signature family of distributions. With this restriction, the problem of finding a sparse distribution as an integer program (IP) may be formulated with $m^2$ variables and polynomially (in N) many constraints. The IP is not described here due to the required additional notation; see Farias, V. F., Jagabathula, S. and Shah, D. (2012), Sparse choice models, Technical report, MIT, Cambridge, Mass., which is incorporated herein by reference in its entirety. While the signature family allows reduction of the aforementioned IP, with N! variables, into an IP with $m^2$ variables, there may not be improvements on the worst-case running time. However, the IP formulation with $m^2$ constraints provides the ability to devise a multiplicative weight update heuristic based on the Plotkin-Shmoys-Tardos (PST) (see Plotkin et al. [1991]) framework. The heuristic is described in detail in Section 5.8 of publication [Farias et al. 2011]. The following guarantees for the heuristic are provided. Assuming access to partial information and existence of a model $\lambda^*$ of sparsity K in the signature family such that $\|y-A\lambda^*\|\le\epsilon$, the multiplicative weight update heuristic will have a computational complexity of $O(\exp(\Theta(K \log N)))$ with a model $\hat{\lambda}$ such that $\|y-A\hat{\lambda}\|<\epsilon$ and the sparsity of $\hat{\lambda}$ is $O(K \log N)$.

Block 106—Processing the Learned Distribution

As mentioned above, the output of the learning process in block 104 is a distribution over a small number of complete ranked lists, known as a sparse distribution. Furthermore, each ranked list is associated with a weight proportional to the prominence or frequency in the population of the ranked list. Each of these lists corresponds to a user type, or mood, that appears in the data with some frequency. Taken separately, these ranked lists capture the full preferences of the corresponding user type or mood.

Given these ranked lists and their weights, it may be desirable to find a ranking for the whole population, or any desired subset. This may be done using the algorithm in the publication A. Ammar and D. Shah (Ranking: Compare, Don't Score. In The 49th Allerton Conference on Communication, Control, and Computing, 2011), described briefly below, and as is incorporated by reference herein, in its entirety.

Ranking the Whole Population

The input of the algorithm is a sparse distribution represented by a collection of complete ordered lists, and the weight for each list. With N items to consider, each ordered list, i, may be represented by a comparison matrix $C_{ij}$, where entry (i,j) is set to 1 if item i is preferred to item j. The entry is set to 0 otherwise. The population comparison matrix, C, is obtained by taking a weighted sum of the comparison matrices, using the weights $r_i$. In general, weights are given to lists, which are then averaged, for example, using the matrix representation of the list, and the result is used to compute scores.

The population matrix, C, is used to compute a score, $s_i$, for each item i, and the scores are used to order the items to obtain the population ranking. The score for item i is computed by taking the average of the $i^{th}$ row in C.

The learned distribution approach is based upon learning a distribution over preferences from partial preferences with sparse support. A distribution is found over very few complete preference lists (or permutations) consistent with observed partial information. The preferences with positive probability in this resulting sparse distribution represent different rankings or moods with the probabilities reflecting how likely that mood is.

It should be noted that the step of learning such sparse distribution consistent with partial information or observations may be performed by one or more of different methods. An example of a method that may be used to learn appropriate distribution from partial preferences is provided by the publication entitled, "Inferring rankings using constrained sensing," by S. Jagabathula and D. Shah, IEEE Transactions on Information Theory, June 2011. In addition, a second example of a method that may be used to learn appropriate distribution from partial preferences is provided by the publication entitled, "A Nonparametric Approach to Modeling Choice with Limited Data," by V. Farias, S. Jagabathula and D. Shah, Management Science, June 2011. Both publications are incorporated herein by reference in their entirety as if their individual disclosures were provided herein.

In the publications, "Sparse Choice Models," by V. Farias, S. Jagabathula and D. Shah as well as "Compare, Don't Score," by A. Ammar and D. Shah, computationally efficient methods for learning sparse distributions have been proposed by the authors. These distributions naturally put positive probability over few ranked lists (complete preferences or permutations) over few parameters. In the case where the resulting distribution itself has sparse support, the few rankings (or preferences) are the ones that have positive probability. In case of distribution with few parameters, one may generate few samples as per the distribution iteratively until the empirical distribution matches partial observations reasonably well. In presence of few parameters, the number of samples required to generate ought to be few. The sample generation can be done in many ways including the classical Markov chain approach.

Data Used

The present system uses the ratings provided by users to capture the preferences of the population. More precisely, the system assumes that a few representative members of the population have expressed their preferences, for example, preferences over restaurants by rating a few of the restaurants that they have visited. This is clearly the type of data that is readily available at ratings sites like Yelp, Zagat, IMDB, Rotten Tomatoes, and others.

In addition to explicit ratings, the present system can also make use of data revealing user preferences implicitly or explicitly. An example of data revealing user preferences implicitly or explicitly includes, but is not limited to, browsing data in which selection (mouse clicking) of one of many possible options "on display" reveals preference of a user for that particular selection over the others "on display".

Further, the present system can also handle data in the form of pair-wise comparisons, which are arguably more "stable" than ratings.

Information Extracted

The heart of the present system and method lies in the crucial observation that when a user rates an item, for example a restaurant, the user is expressing an opinion about the restaurant not just in isolation, but in relation to other restaurants that the user has rated. For instance, if a user consistently rates Mexican restaurants higher than French restaurants, then the user apparently prefers Mexican to French restaurants. Similarly, even within a particular cuisine, a user might prefer expensive restaurants by consistently rating them higher than cheaper ones. Furthermore, the user might express more complicated preferences such as the user might generally prefer expensive to cheaper restaurants, except in some location, where cheaper restaurants are more preferred.

Given this, just from the ratings, users provide complex information about their preferences over restaurants. The present system and method postulates that the collective preferences and likings of the population can be captured via a distribution over all possible different rankings of different choices (such as restaurants in the above example). Learning such distribution from partial information allows better capturing of population preferences.

Ranking

The present system and method provides for extracting the aforementioned preference information of the users. More precisely, as mentioned above, the population's overall likings are described through a distribution over permutations. The distribution should be consistent with the partial preferences observed in data. Given these constraints, the present system and method finds such a sparse distribution.

Figure 3:
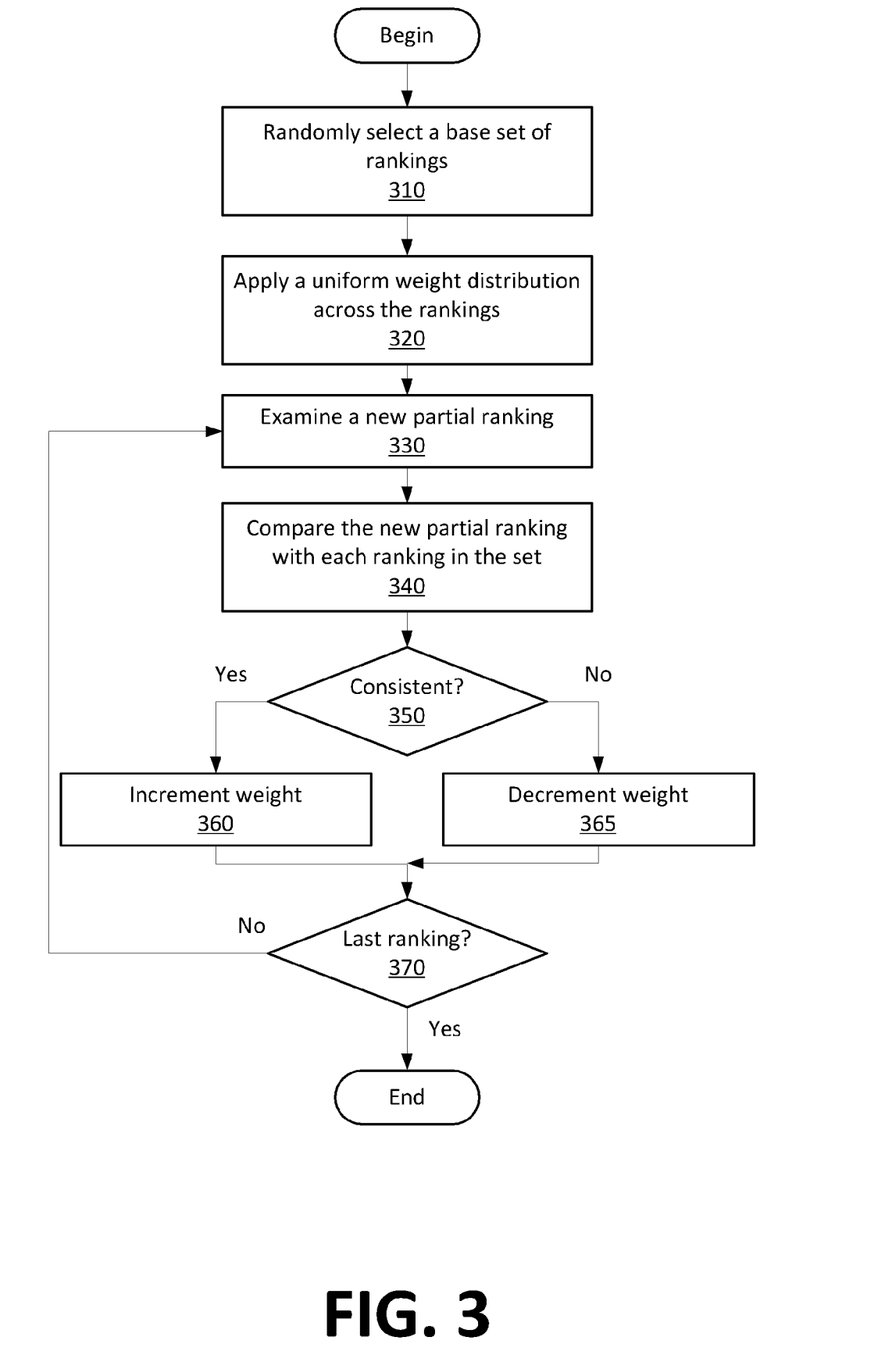
FIG. 3 is a flowchart of an exemplary method for weighting sparse distribution rankings.

One way to produce such sparse distribution is to employ methods described in the publications mentioned above. Another method is as follows, as shown by the flowchart in FIG. 3. Start with few randomly chosen rankings as possible rankings, as shown by block 310. Initially, place uniform probability (or weight) distribution over all these rankings, as shown by block 320. Then, one by one, incorporate the partial observations (stored or newly arriving), as shown by block 330. In the process adjust probabilities (or weights) over these rankings. Compare the new partial ranking with each ranking in the set, as shown by block 340. Since it is believed that the distribution over these ranked lists with their associated probabilities or weights represent the population's behavior, every time a new preference is incorporated, the weights of all rankings that are consistent with this preference are incremented by a small amount), as shown by block 360, while the weights of all rankings that are not consistent with this preference are decremented by a small amount, as shown by block 365. As more and more data is incorporated, the weights over the candidate rankings start shaping up appropriately. In effect, at any state, these weighted rankings reflect a distribution with probability on few rankings that is (near) consistent with partial observations. And the numerical weight assigned to each ranked-list or ranking corresponds to the significance of the ranked list in the population; specifically, if the weight of ranked list r1 is more than that of ranked list r2, then more users in the population behave according to ranked list r1 than ranked list r2.

Among other factors, two important aspects to the present invention are of particular importance. First, the problem of learning multiple ranked-lists or top lists is not considered. In addition, it has not previously been modeled through a distribution over rankings. This modeling, especially through distribution with very few ranked-lists having positive probability (distribution with sparse support) is important to produce few but multiple rankings to capture the preferences of the population. Second, most existing methods for learning distributions over rankings are parametric. This has apparently appeared necessary to combat the high dimensionality of this structure. Unfortunately, such parametric modeling injects artificial information into the recommendation system, which can severely hamper performance. In contrast, the present system and method is entirely non-parametric.

System

Figure 2:
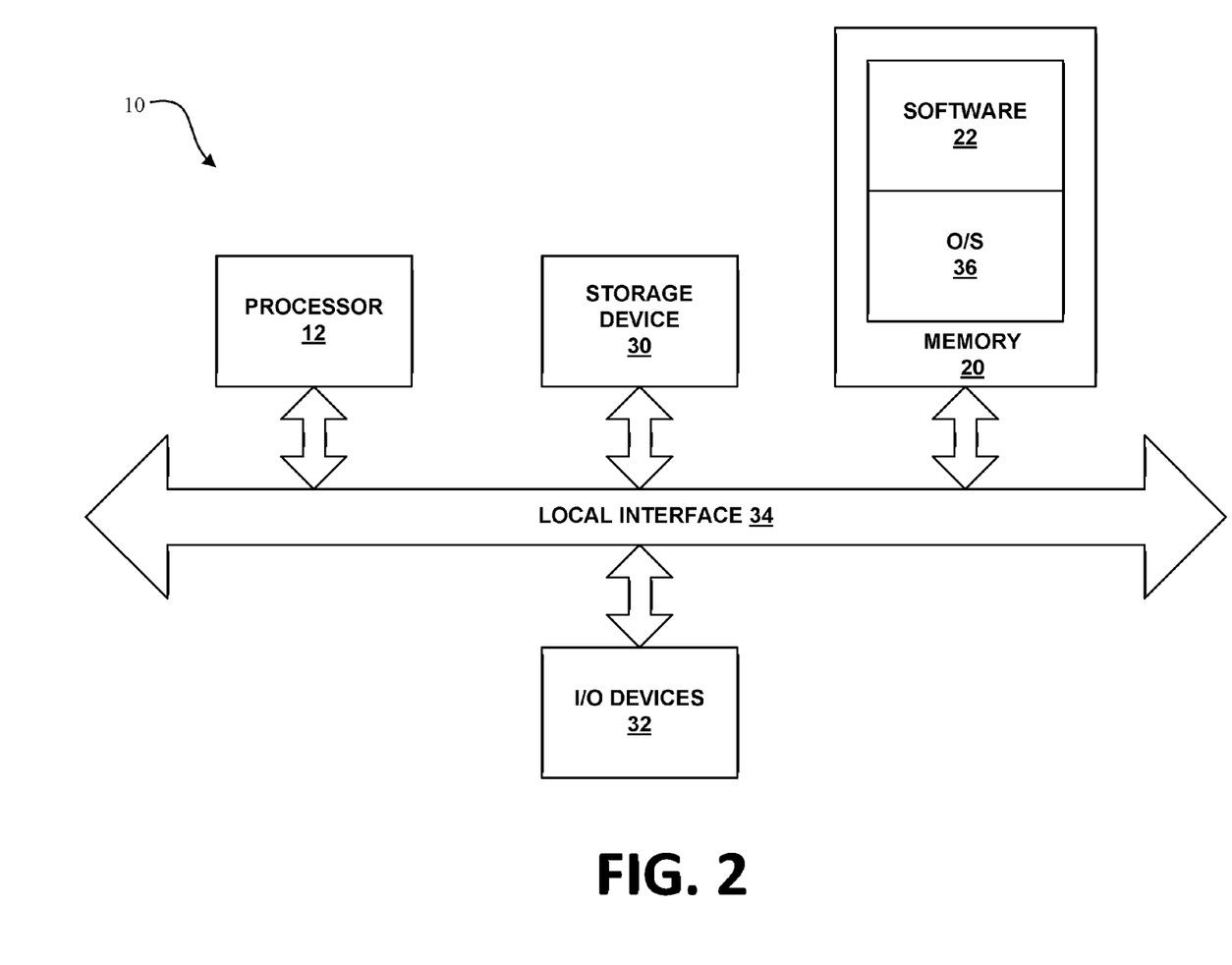
FIG. 2 is a schematic diagram of an embodiment of a system for implementing the present invention.

Functionality performed by the present invention can be implemented in software, firmware, hardware, or a combination thereof. In a first exemplary embodiment, a portion of the present system is implemented in software, as an executable program, and is executed by a special or general-purpose digital computer, such as a personal computer, personal data assistant, smart phone, workstation, minicomputer, or mainframe computer. The first exemplary embodiment of a computer 10 capable of performing functionality of the present invention is shown in FIG. 2.

Generally, in terms of hardware architecture, the computer 10 includes a processor 12, memory 20, storage device 30, and one or more input and/or output (I/O) devices 32 (or peripherals) that are communicatively coupled via a local interface 34. The local interface 34 can be, for example but not limited to, one or more buses or other wired or wireless connections, as is known in the art. The local interface 34 may have additional elements, which are omitted for simplicity, such as controllers, buffers (caches), drivers, repeaters, and receivers, to enable communications. Further, the local interface 34 may include address, control, and/or data connections to enable appropriate communications among the aforementioned components.

The processor 12 is a hardware device for executing software, particularly that stored in the memory 20. The processor 12 can be any custom made or commercially available processor, a central processing unit (CPU), an auxiliary processor among several processors associated with the computer 10, a semiconductor based microprocessor (in the form of a microchip or chip set), a macroprocessor, or generally any device for executing software instructions.

The memory 20 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 20 may incorporate electronic, magnetic, optical, and/or other types of storage media. Note that the memory 20 can have a distributed architecture, where various components are situated remote from one another, but can be accessed by the processor 12.

The software 22 in the memory 20 may include one or more separate programs, each of which contains an ordered listing of executable instructions for implementing logical functions of the computer 10, as described below. In the example of FIG. 2, the software 22 in the memory 20 defines the computer 10 functionality in accordance with the present invention. In addition, although not required, it is possible for the memory 20 to contain an operating system (O/S) 36. The operating system 36 essentially controls the execution of computer programs and provides scheduling, input-output control, file and data management, memory management, and communication control and related services.

The computer 10 may be provided a source program, executable program (object code), script, or any other entity containing a set of instructions to be performed. For a source program, the program needs to be translated via a compiler, assembler, interpreter, or the like, which may or may not be included within the memory 20, so as to operate properly in connection with the O/S 36. Furthermore, the computer 10 functionality can be written as (a) an object oriented programming language, which has classes of data and methods, or (b) a procedure programming language, which has routines, subroutines, and/or functions.

The I/O devices 32 may include input devices, for example but not limited to, a touch screen, a keyboard, mouse, scanner, microphone, or other input device. Furthermore, the I/O devices 32 may also include output devices, for example but not limited to, a display, or other output devices. The I/O devices 32 may further include devices that communicate via both inputs and outputs, for instance but not limited to, a modulator/demodulator (modem; for accessing another device, system, or network), a radio frequency (RF), wireless, or other transceiver, a telephonic interface, a bridge, a router, or other devices that function both as an input and an output.

When the computer 10 is in operation, the processor 12 is configured to execute the software 22 stored within the memory 20, to communicate data to and from the memory 20, and to generally control operations of the computer 10 pursuant to the software 22. The software 22 and the O/S 36, in whole or in part, but typically the latter, are read by the processor 12, perhaps buffered within the processor 12, and then executed.

When the functionality of the invention is implemented in software, as is shown in FIG. 2, it should be noted that the functionality can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The functionality of the present invention can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The storage device 30 of the computer 10 may be one of many different types of storage device, including a stationary storage device or portable storage device. As an example, the storage device 30 may be a magnetic tape, disk, flash memory, volatile memory, or a different storage device. In addition, the storage device may be a secure digital memory card or any other removable storage device 30.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for determining multiple rankings from a set of partial preferences comprising the steps of:
   receiving, by a computer, a plurality of partial preferences reflecting the preferences of a population;
   forming a plurality of preference lists, where each preference list is a collection of partial preferences collected from a sub population of said population;
   learning sparse distribution over all possible ranked lists or preference lists that is consistent with the formed plurality of preference lists such that the resulting distribution assigns positive probability to the fewest possible ranked lists; and
   processing said learned sparse distribution over ranked lists to produce multiple popular ranked lists by identifying the ranked list that have positive probability under the learned sparse distribution over ranked lists,
   wherein each ranked list of said plurality of ranked lists is said to correspond to a mood or type of a sub population of said population.

2. The method of claim 1, further comprising the step of selecting said plurality of partial preferences from said first preference list and said second preference list.

3. The method of claim 1 further comprising the step of assigning a score to each of said plurality of partial preferences.

4. The method of claim 1 further comprising the steps of:
   comparing a single partial preference to said plurality of partial preferences; and
   adjusting the weight of said first preference list and said second preference list.

5. The method of claim 4, further comprising the step of selecting said single partial preference from said first preference list and said second preference list.

6. The method of claim 1, further comprising the step of determining a partial preference from a preference ordered list of items.

7. The method of claim 1, further comprising the step of determining a partial preference from a pair-wise comparison.

8. The method of claim 1, further comprising the step of selecting said first preference list and said second preference list from a population of partial preferences.

9. The method of claim 8, further comprising the step of identifying a sparsest distribution consistent with said population of partial preferences.

10. A system for determining multiple rankings from a set of partial preferences comprising a computer comprising a processor and a memory configured to perform the steps comprising:
   receiving a plurality of partial preferences reflecting the preferences of a population;
   forming a plurality of preference lists, where each preference list is a collection of partial preferences collected from a sub population of said population;
   learning sparse distribution over all possible ranked lists or preference lists that is consistent with the formed plurality of preference lists such that the resulting distribution assigns positive probability to the fewest possible ranked lists; and
   processing said learned sparse distribution over ranked lists to produce multiple popular ranked lists by identifying the ranked list that have positive probability under the learned sparse distribution over ranked lists,
   wherein each ranked list of said plurality of ranked lists is said to correspond to a mood or type of a sub population of said population.

* * * * *